(12) United States Patent
Park et al.

(10) Patent No.: US 10,746,990 B2
(45) Date of Patent: Aug. 18, 2020

(54) MULTI-FOCAL AUGMENTED REALITY DEVICE

(71) Applicant: KOREA INSTITUTE OF SCIENCE AND TECHNOLOGY, Seoul (KR)

(72) Inventors: Soongi Park, Seoul (KR); Minkoo Kang, Seoul (KR); Sungkyu Kim, Seoul (KR)

(73) Assignee: Korea Institute of Science and Technology, Seoul (KR)

( * ) Notice: Subject to any disclaimer, the term of this patent is extended or adjusted under 35 U.S.C. 154(b) by 135 days.

(21) Appl. No.: 16/129,636

(22) Filed: Sep. 12, 2018

(65) Prior Publication Data

US 2019/0317320 A1    Oct. 17, 2019

(30) Foreign Application Priority Data

Apr. 11, 2018  (KR) .................. 10-2018-0042256

(51) Int. Cl.
*G02B 27/01* (2006.01)
*G06T 19/00* (2011.01)
*G02B 27/00* (2006.01)
*G02B 27/14* (2006.01)

(52) U.S. Cl.
CPC ..... *G02B 27/0101* (2013.01); *G02B 27/0093* (2013.01); *G02B 27/14* (2013.01); *G06T 19/006* (2013.01); *G02B 2027/013* (2013.01)

(58) Field of Classification Search
CPC ........ G02B 27/0172; G02B 2027/0178; G02B 27/0176; G02B 27/0101; G02B 2027/0118

USPC .......................................................... 359/630
See application file for complete search history.

(56) References Cited

U.S. PATENT DOCUMENTS

2017/0269366 A1* 9/2017 Lee .................. G02B 27/0172
2019/0094981 A1* 3/2019 Bradski ................. G02B 30/26

FOREIGN PATENT DOCUMENTS

| JP | 09-331552 A | 12/1997 |
| KR | 10-2015-0070195 A | 6/2015 |
| KR | 10-2016-0134714 A | 11/2016 |
| KR | 10-2017-0065578 A | 6/2017 |
| KR | 10-2017-0107750 A | 9/2017 |

OTHER PUBLICATIONS

Korean Office Action dated Apr. 23, 2019.
Korean Office Action dated Jan. 22, 2019.
Chang-Kun Lee et al., "Compact three-dimensional head-mounted display system with Savart plate", Optics Express, Aug. 22, 2016, pp. 19531-19544, vol. 24, No. 17.
Fu-Chung Huang et al., "The Light Field Stereoscope", ACM SIGGRAPH, 2015, vol. 33, No. 5.

* cited by examiner

*Primary Examiner* — Mohammed A Hasan
(74) *Attorney, Agent, or Firm* — Rabin & Berdo, P.C.

(57) ABSTRACT

A multi-focal augmented reality device may include a multi-focal display that provides a plurality of images output from a plurality of image-providing devices and located at different depths and an augmented reality image synthesis device that synthesizes the plurality of images provided by the multi-focal display and an external image.

10 Claims, 6 Drawing Sheets

MULTI-FOCAL AUGMENTED REALITY DEVICE

CROSS-REFERENCE TO RELATED APPLICATION

This application claims priority to and the benefit of Korean Patent Application No. 2018-0042256, filed on Apr. 11, 2018, the disclosure of which is incorporated herein by reference in its entirety.

BACKGROUND

1. Field of the Invention

The present invention relates to an augmented reality device, and more particularly, to a multi-focal 3D head-mounted display that provides augmented reality.

2. Discussion of Related Art

Commercial augmented reality (AR) or virtual reality (VR) head-mounted displays (HMDs) in the related art can provide stereoscopic images based on binocular disparity. However, the AR or VR HMDs cannot provide adjustment information for each eye. Therefore, popularization of the AR or VR HMDs is hampered due to their fundamental problems, such as eye fatigue, defocusing according to a fixation depth, and the like. In addition, AR displays in the related art provide only a single focus at the infinite depth or at a depth greater than or equal to a middle distance, and when a user views an object that is located at a short distance ranging from 0.3 m to 0.8 m and that interacts with the user's hand, visual fatigue may be caused by a mismatch between the focus position of an image and the focus position of the object viewed by the user.

For example, a compact 3D HMD with a Savart plate provides multiple focuses by using the Savart plate having different optical paths depending on polarization, but has problems in that the video frame rate of an implemented image is decreased due to temporal multiplexing and the long-term stability of a system is deteriorated due to the use of a birefringent material (e.g., calcite) that is sensitive to a vibration/temperature change. In another example, an HMD that provides focus adjustment factors by applying a laminated liquid crystal panel structure and a compressive light field display method has problems in that the HMD is of a closed type so that a see-through optical system is additionally required to implement AR and image quality reduction factors are caused by a diffraction effect due to the laminated liquid crystal structure. In another example, a see-through display, which includes a multi-path optical element and an anisotropic optical element that are used to transfer a plurality of images according to a plurality of paths to a user, has a problem in that the see-through display is focused on synthesizing images through two paths by using the anisotropic optical member, rather than implementing a multi-focal image.

SUMMARY OF THE INVENTION

The present disclosure is directed to providing a multi-focal augmented reality device that changes an image-providing device that is driven when a user's fixation point is located in a short range, by using an additional image-providing device for a close image and an eye tracking sensor, thus alleviating the problem of defocusing.

The present disclosure is directed to providing a multi-focal augmented reality device that provides additional depth planes by using a plurality of image-providing devices, provides an additional depth plane by synthesizing optical paths using a beam splitter, and drives only the closest image to a user's fixation point by tracking the user's eyes, thereby minimizing vergence-accommodation conflict and visual fatigue due to focus adjustment and thus sharply improving convenience of prolonged use of an augmented reality or virtual reality head-mounted display (HMD).

According to an aspect of the present disclosure, a multi-focal augmented reality device may include a multi-focal display that provides a plurality of images output from a plurality of image-providing devices and located at different depths and an augmented reality image synthesis device that synthesizes the plurality of images provided by the multi-focal display and an external image.

The plurality of image-providing devices may be disposed at different distances from a lens between the multi-focal display and the augmented reality image synthesis device to provide the plurality of images located at the different depths.

The multi-focal display may include a beam splitter that matches travelling directions of the plurality of images by passing some of the plurality of images and reflecting the other images, such that the plurality of images provided from the plurality of image-providing devices are viewed at the same position by a user.

The number of beam splitters may be one less than the number of image-providing devices.

The augmented reality image synthesis device may include a beam splitter that synthesizes the images provided by the multi-focal display and the external image. The beam splitter may be disposed to reflect the images provided by the multi-focal display and to pass the external image, and an image synthesized through the beam splitter may be provided in a stereoscopic 3D manner.

The augmented reality image synthesis device may include a beam splitter and a concave mirror that synthesize the images provided by the multi-focal display and the external image. The beam splitter may be disposed to reflect an image provided by the multi-focal display and then reflected by the concave mirror after passing through the beam splitter and to pass the external image.

The multi-focal augmented reality device may further include a controller that processes the images provided by the plurality of image-providing devices, such that an image output through the augmented reality image synthesis device is viewed at a predetermined specific depth.

The controller may apply a depth-fused 3D method for adjusting luminance ratios of the images provided by the plurality of image-providing devices or a compressive light field display method for representing rays of light constituting the images as the sum or product of pixels located at the specific depth.

The multi-focal augmented reality device may further include an eye tracking sensor that tracks eyes of a user that views an image output from the augmented reality image synthesis device and a controller that operates in conjunction with the eye tracking sensor to selectively drive only some of the plurality of image-providing devices, based on information received from the eye tracking sensor.

The controller may measure a fixation depth of the user, based on an interpupillary distance and a binocular vergence angle obtained from the eye tracking sensor, and may drive only an image-providing device that provides an image closest to the fixation depth, among the plurality of image-providing devices.

The plurality of image-providing devices may correspond to an organic light emitting diode (OLED), a liquid crystal display (LCD), a liquid crystal on silicon (LCoS), a digital micro-mirror device (DMD), or a micro-electro-mechanical system (MEMS) scanning mirror.

As described above, the present disclosure can reduce visual fatigue when a user views a close augmented-reality image, can implement an optimal virtual image by operating in conjunction with eye tracking or by applying a depth-fused 3D method, a compressive light field display method, or the like, and can be easily implemented through a simple configuration using a beam splitter, and is thus highly applicable to various virtual reality devices or augmented reality devices.

BRIEF DESCRIPTION OF THE DRAWINGS

The above and other objects, features and advantages of the present disclosure will become more apparent to those of ordinary skill in the art by describing in detail exemplary embodiments thereof with reference to the accompanying drawings, in which.

DETAILED DESCRIPTION OF EXEMPLARY EMBODIMENTS

The above and other aspects, features, and advantages of the present disclosure will become apparent from the following description of the following embodiments given in conjunction with the accompanying drawings. However, it should be understood that the present disclosure is not limited to the following embodiments and may be implemented in different ways. Herein, the embodiments are provided to provide complete disclosure of the present disclosure and to provide thorough understanding of the present disclosure to those skilled in the art to which the present disclosure pertains, and the scope of the present disclosure should be limited only by the accompanying claims and equivalents thereof. In addition, like numerals will denote like components throughout the specification, and the meaning of "and/or" includes each mentioned item and every combination of mentioned items.

It will be understood that, although the terms first, second, etc. may be used herein to describe various elements, components, and/or sections, these elements, components, and/or sections should not be limited by these terms. These terms are only used to distinguish one element, component, or section from another element, component, or section. Thus, a first element, component, or section discussed below could be termed a second element, component, or section without departing from the teachings of the present disclosure.

Terms used herein are only for description of embodiments and are not intended to limit the present disclosure. As used herein, the singular forms are intended to include the plural forms as well, unless context clearly indicates otherwise. It will be further understood that the terms "comprises" and/or "comprising," when used in this specification, specify the presence of stated components, steps, operations, and/or elements, but do not preclude the presence or addition of one or more other components, steps, operations, and/or elements.

Unless otherwise defined, all terms (including technical and scientific terms) used herein have the same meaning as commonly understood by those skilled in the art to which the present disclosure pertains. It will be further understood that terms, such as those defined in commonly used dictionaries, should not be interpreted in an idealized or overly formal sense unless expressly so defined herein.

Furthermore, in describing the present disclosure, detailed descriptions related to well-known functions or configurations will be omitted when they may make subject matters of the present disclosure unnecessarily obscure. In addition, terms used herein are defined by taking functions of the present disclosure into account and can be changed according to user or operator custom or intention. Therefore, definition of the terms should be made according to the overall disclosure set forth herein.

Figure 1:
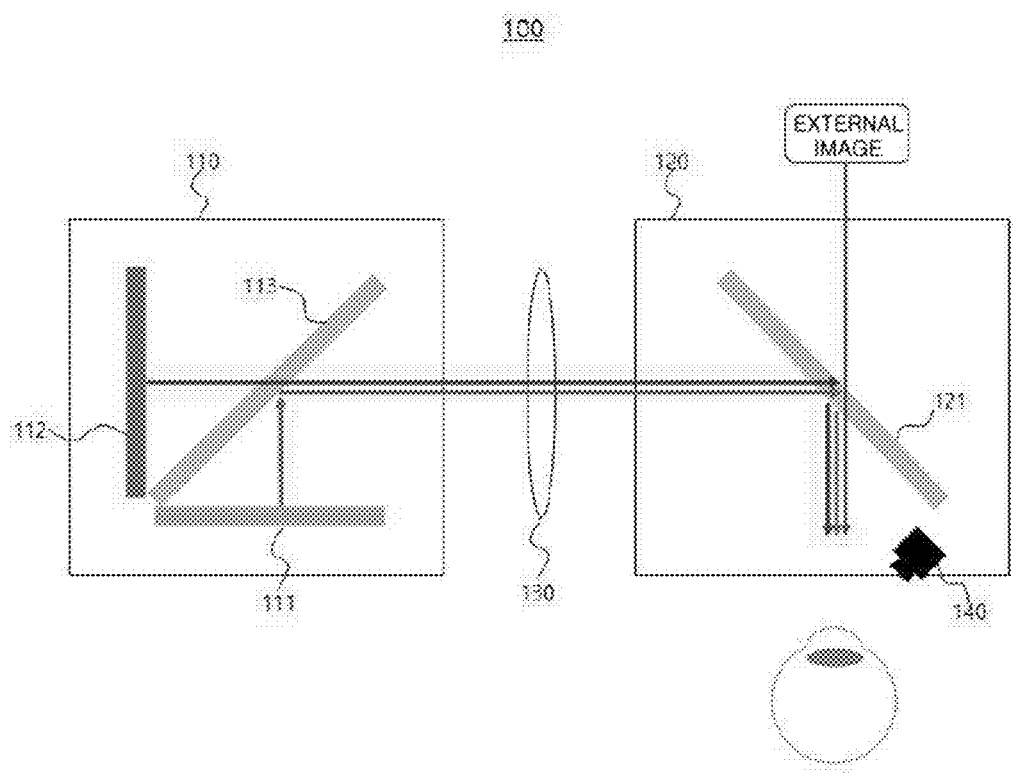
FIG. 1 illustrates a multi-focal augmented reality device according to an exemplary embodiment of the present disclosure.

FIG. 1 illustrates a multi-focal augmented reality device according to an exemplary embodiment of the present disclosure.

Referring to FIG. 1, a multi-focal augmented reality device 100 may include a multi-focal display 110, an augmented reality image synthesis device 120, a lens 130 disposed between the multi-focal display 110 and the augmented reality image synthesis device 120, and eye tracking sensors 140 for tracking a movement of a user's eyes.

The multi-focal display 110 may provide a plurality of images output from a plurality of image-providing devices 111 and 112 and located at different depths. The multi-focal display 110 may include the plurality of image-providing devices 111 and 112 and a beam splitter 113.

The plurality of image-providing devices 111 and 112 may be disposed at different distances from the lens 130 to provide a plurality of virtual images located at different depths, and the virtual images may be located at user-desired depths by the lens 130. For example, the image-providing devices 111 and 112 may correspond to an organic light emitting diode (OLED), a liquid crystal display (LCD), a liquid crystal on silicon (LCoS), a digital micro-mirror device (DMD), or a micro-electro-mechanical system (MEMS) scanning mirror.

In an embodiment, luminance uniformity, color uniformity, or aberration distortion of the plurality of image-providing devices 111 and 112 may be corrected, and observation areas may be arranged such that the observation areas are identically viewed. More specifically, a difference in luminance uniformity between the plurality of image-providing devices 111 and 112 may be corrected by applying an image processing method in the related art. For example, when the image-providing device 111 has a luminance of 100 $cd/m^2$ and the image-providing device 112 has a luminance of 200 $cd/m^2$, the luminance uniformity difference may be adjusted by halving an input value of an image itself that is input to the image-providing device 112. That is, when the image-providing device 111 has an image luminance input value of 100, the plurality of image-providing devices 111 and 112 may have a luminance of 100 $cd/m^2$, by modifying an image luminance input value of the image-providing device 112 to 50. The color uniformity may be implemented by correcting luminance uniformity for each color of the plurality of image-providing devices 111 and 112. The aberration distortion may be corrected by displaying a pre-distorted image that opposes distortion caused by the lens 130, and here an image processing method generally used in HMDs may be applied. When the observation areas (that is, the sizes of viewed images) are arranged such that the observation areas are identically viewed, the sizes of the images output by the plurality of image-providing devices 111 and 112 may be matched by cropping an area of an image-providing device that appears larger, among the plurality of image-providing devices 111 and 112, to match an area of an image-providing device that appears smaller. The beam splitter 113 may match travelling directions of the plurality of images by passing some of the plurality of images and reflecting the other images, such that the plurality of images provided from the plurality of image-providing devices 111 and 112 are viewed at the same position by the user. Here, the beam splitter 113 may correspond to a half mirror, and the number of beam splitters 113 may be one less than the number of image-providing devices.

The augmented reality image synthesis device 120 may synthesize the images provided by the multi-focal display 110 and an external image and may output. The augmented reality image synthesis device 120 may include a beam splitter 121.

The beam splitter 121 may be disposed to reflect the images provided by the multi-focal display 110 and to pass the external image and may synthesize the images provided by the multi-focal display 110 and the external image. Here, an image synthesized by the beam splitter 121 may be provided in a stereoscopic 3D manner. Furthermore, in the case where the plurality of image-providing devices 111 and 112 correspond to an LCD, an LCoS, or an OLED that applies polarization, a polarization beam splitter may be used as the beam splitter 121 to minimize luminance loss of the image.

The ratio of transmittance to reflectance of the beam splitters 113 and 121 may be adjusted such that the luminance of an image output from each image-providing device is the same when observed by the user. For example, the ratio of transmittance to reflectance of the beam splitters 113 and 121 may be 50:50. Here, the ratio of transmittance to reflectance of the beam splitters 113 and 121 may be determined by adjusting the thickness of metal coating at the time of manufacturing the beam splitters 113 and 121. For example, as the thickness of the metal coating increases, the reflectance may increase and the transmittance may decrease. In contrast, as the thickness of the metal coating decreases, the reflectance may decrease and the transmittance may increase.

Figure 2:
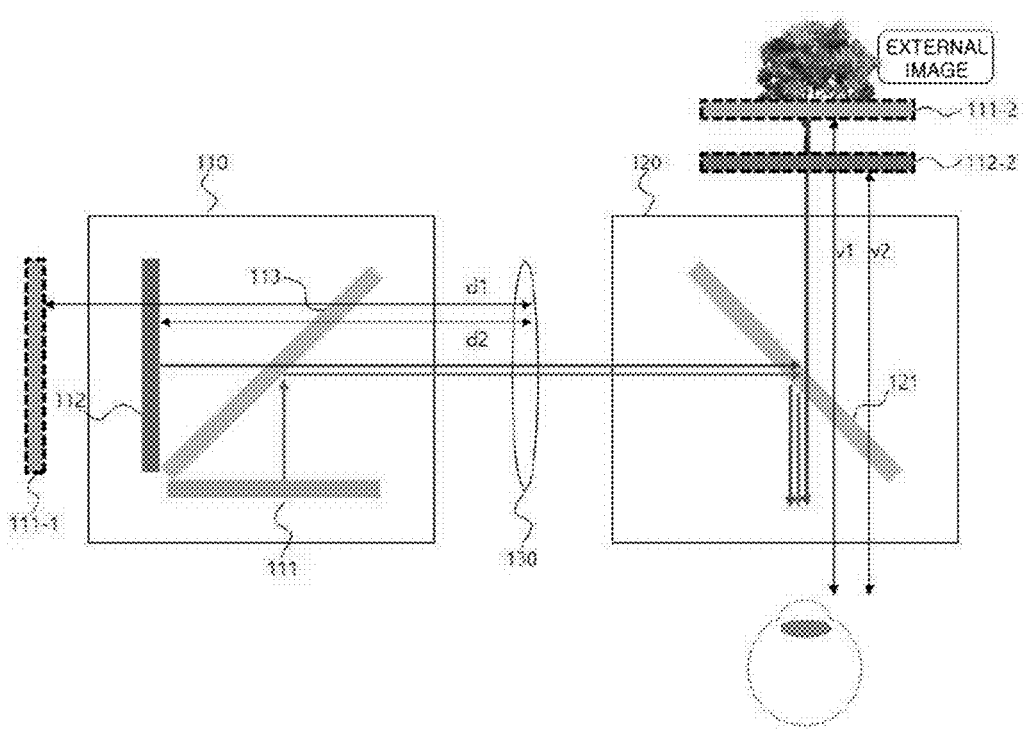
FIG. 2 illustrates an operation of the multi-focal augmented reality device of FIG. 1.

More specifically, referring to FIG. 2, an image output from the image-providing device 111 of the multi-focal display 110 may be provided to the augmented reality image synthesis device 120 through the lens 130 after being reflected by the beam splitter 113, and an image output from the image-providing device 112 may be provided to the augmented reality image synthesis device 120 through the lens 13 after passing through the beam splitter 113. The images provided by the multi-focal display 110 may be reflected by the beam splitter 121 of the augmented reality image synthesis device 120, and an external image may pass through the beam splitter 121. Thereafter, the reflected images and the external image may be synthesized, and a user may view a virtual image in which the images output from the plurality of image-providing devices 111 and 112 and the external image are synthesized.

Here, the depth of a virtual image output from each image-providing device may be determined based on the distance between the image-providing device and the lens 130. When the lens 130 has a focal length of f, a virtual depth $v_n$ of an image-providing device spaced apart from the lens 130 by a distance of $d_n$ may be determined by Equation 1 below.

$$v_n = \frac{d_n f}{d_n - f} \quad \text{[Equation 1]}$$

Referring to FIG. 2, $d_1$ may be a distance between an image-providing device 111-1 and the lens 130, and the image-providing device 111-1 may correspond to an image of the image-providing device 111 due to the beam splitter 113. $v_1$, determined by Equation 1 above, may be a virtual depth of an image 111-2 output from the image-providing device 111 due to the beam splitter 121. $d_2$ may be a distance between the image-providing device 112 and the lens 130, and $v_2$, determined by Equation 1 above, may be a virtual depth of an image 112-2 output from the image-providing device 112 due to the beam splitter 121.

Hereinafter, modified embodiments of the multi-focal augmented reality device 100 illustrated in FIGS. 1 and 2 will be described. In describing augmented reality devices according to embodiments of the present disclosure, detailed descriptions of components identical to those described with reference to FIGS. 1 and 2 will be omitted.

Figure 3:
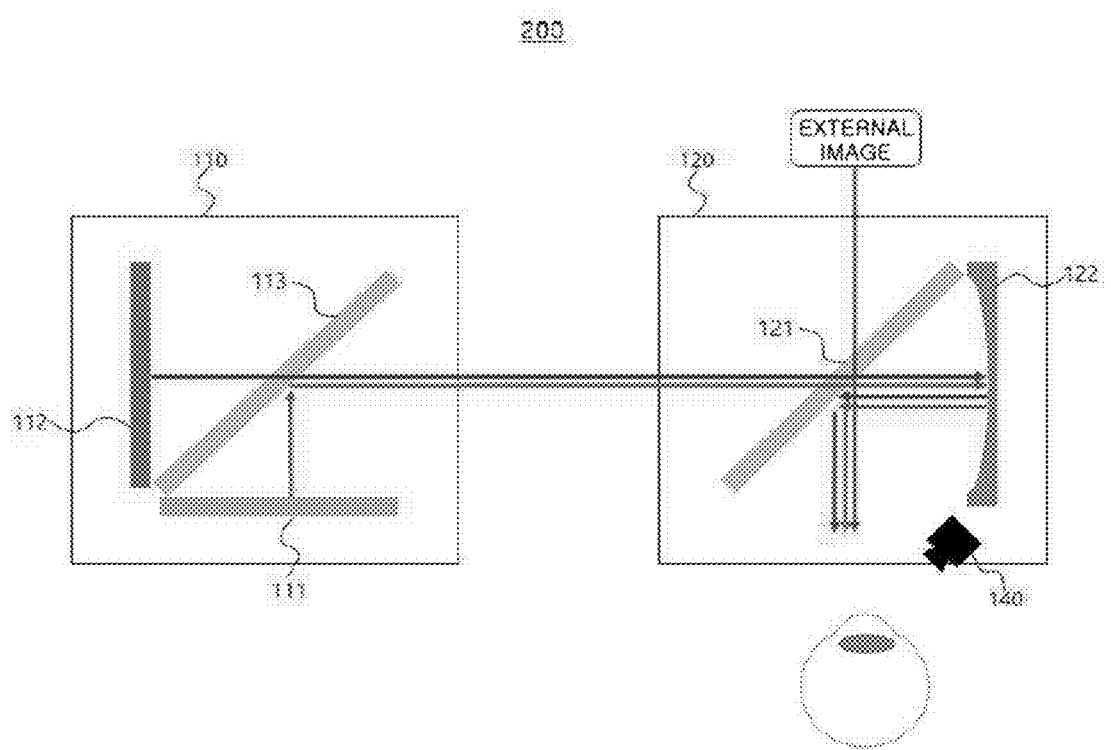
FIG. 3 illustrates a multi-focal augmented reality device according to an embodiment of the present disclosure.

FIG. 3 illustrates a multi-focal augmented reality device according to an embodiment of the present disclosure.

Referring to FIG. 3, a multi-focal display 110 of a multi-focal augmented reality device 200 may include a plurality of image-providing devices 111 and 112 and a beam splitter 113, and an augmented reality image synthesis device 120 may include a beam splitter 121 and a concave mirror 122 that are used to synthesize images provided by the multi-focal display 110 and an external image. Here, the beam splitter 121 may be disposed to pass the external image and to reflect images that are provided by the multi-focal display 110 and reflected by the concave mirror 122 after passing through the beam splitter 121. Furthermore, in the embodiment of FIG. 3, a lens may be additionally disposed to correct aberration.

More specifically, an image output from the image-providing device 111 of the multi-focal display 110 may be provided to the augmented reality image synthesis device 120 after being reflected by the beam splitter 113, and an image output from the image-providing device 112 may be provided to the augmented reality image synthesis device 120 after passing through the beam splitter 113. The images provided by the multi-focal display 110 may pass through the beam splitter 121 of the augmented reality image synthesis device 120 and may reach the concave mirror 122, and images reflected by the concave mirror 122 may be reflected by the beam splitter 121 and may be synthesized with the external image passing through the beam splitter 121. Accordingly, a user may view a virtual image in which the external image and the images output from the plurality of image-providing devices 111 and 112 are synthesized.

Figure 4:
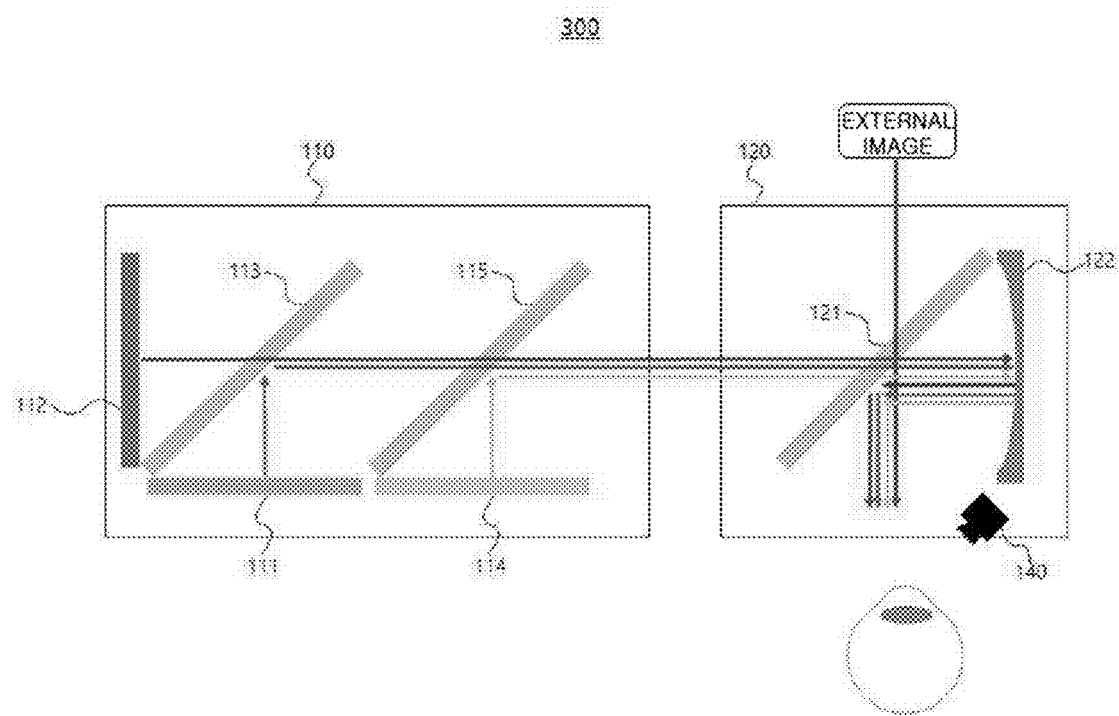
FIG. 4 illustrates a multi-focal augmented reality device according to another embodiment of the present disclosure.

FIG. 4 illustrates a multi-focal augmented reality device according to another embodiment of the present disclosure.

Referring to FIG. 4, a multi-focal display 110 of a multi-focal augmented reality device 300 may include a plurality of image-providing devices 111, 112, and 114 and a plurality of beam splitters 113 and 115, and an augmented reality image synthesis device 120 may include a beam splitter 121 and a concave mirror 122 that are used to synthesize images provided by the multi-focal display 110 and an external image. Here, the configuration of the augmented reality image synthesis device 120 is identical to the configuration of the augmented reality image synthesis device 120 of the multi-focal augmented reality device 300 illustrated in FIG. 3.

As illustrated in FIG. 4, the additional beam splitter 115 may be used when three or more image-providing devices 111, 112, and 114 are used, and the number of beam splitters required for synthesizing images output from the plurality of image-providing devices 111, 112, and 114 may be determined by Equation 2 below.

$$n_m = n_d - 1,$$  [Equation 2]

where $n_m$ is the number of beam splitters and $n_d$ is the number of image-providing devices.

The ratios of transmittance to reflectance of the plurality of beam splitters 113 and 115 may vary with the number of image-providing devices 111, 112, and 114. More specifically, the ratio of transmittance to reflectance of each of the plurality of beam splitters 113 and 115 may be determined such that the number of times that images output from the respective image-providing devices are transmitted and reflected until reaching a user's eyes agrees with the product of the transmittance and the reflectance of the corresponding beam splitter. For example, assuming that the plurality of beam splitters 113 and 115 with the same luminance are used, the beam splitter 113 of FIG. 4 has to have a ratio of 1:1 since the beam splitter 113 directly passes and reflects images output from the two image-providing devices 111 and 112, and the ratio of transmittance to reflectance of the beam splitter 115 may be determined to be 2:1 since the beam splitter 115 passes the transmitted image, the luminance of which is reduced by a half through the beam splitter 113, and reflects an image output from the image-providing device 114. It can be generalized such that, when $n_d$ image-providing devices are used, the ratio of transmittance to reflectance of the last beam splitter is $n_m$:1 and the luminance of the finally-viewed multi-focal image is reduced to $1/n_m$ of the original display luminance.

An image output from the image-providing device 111 of the multi-focal display 110 may be reflected by the beam splitter 113 and may be provided to the augmented reality image synthesis device 120 after passing through the beam splitter 115. An image output from the image-providing device 112 may be provided to the augmented reality image synthesis device 120 after passing through the plurality of beam splitters 113 and 115. An image output from the image-providing device 114 may be reflected by the beam splitter 115 and may then be provided to the augmented reality image synthesis device 120. Thereafter, the images provided by the multi-focal display 110 may pass through the beam splitter 121 of the augmented reality image synthesis device 120 and may then be reflected by the concave mirror 122. The reflected images may be reflected again by the beam splitter 121 and may be provided to the user after being synthesized with an external image passing through the beam splitter 121.

Figure 5:
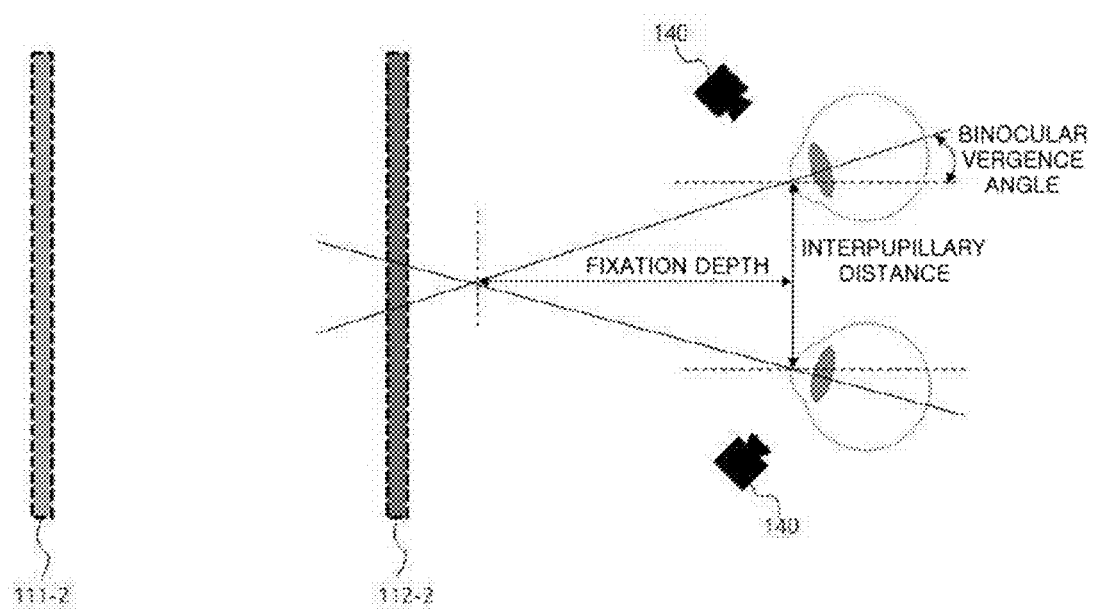
FIGS. 5 and 6 illustrate methods for providing multi-focal augmented reality.
Figure 6:
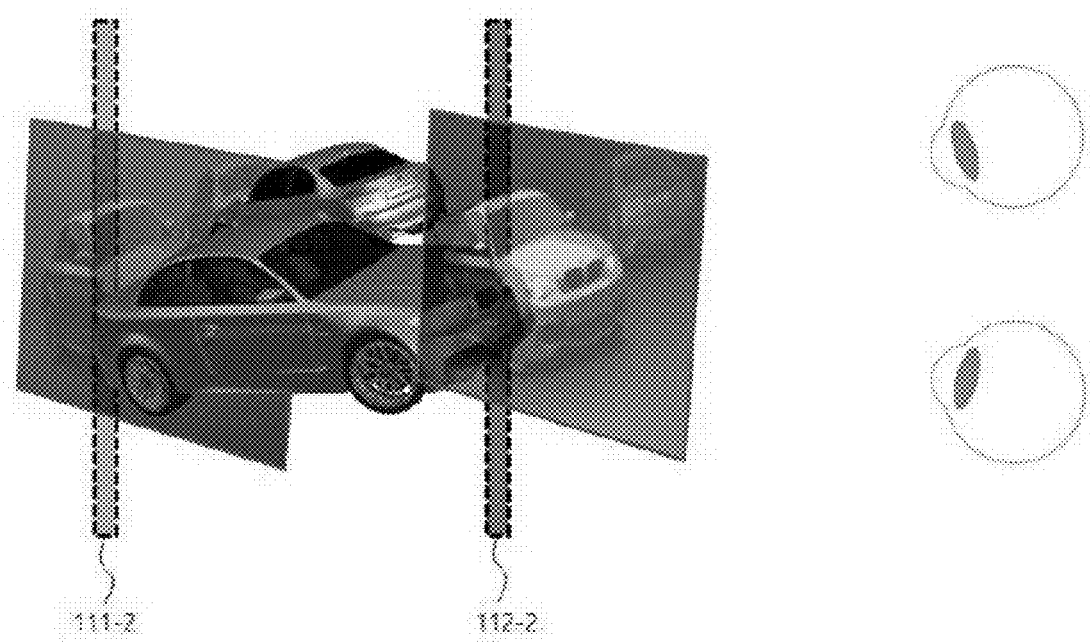

In an embodiment, the multi-focal augmented reality devices described with reference to FIGS. 1 to 4 may further include a controller (not illustrated). In order to reduce visual fatigue when the user views a close augmented-reality image, the controller may selectively drive one of image-providing devices, or may process images output from the plurality of image-providing devices, to allow an augmented reality image to be viewed at a specific depth. Hereinafter, operations performed by the controller will be described with reference to FIGS. 5 and 6. FIGS. 5 and 6 illustrate examples that the virtual images 111-2 and 112-2 of the plurality of image-providing devices 111 and 112 are output at specific depths. The following description may be applied to all of the multi-focal augmented reality devices described with reference to FIGS. 1 to 4 and may also be identically applied to a multi-focal augmented reality device having three or more image-providing devices.

FIG. 5 illustrates an example that the controller selectively drives one of image-providing devices. Referring to FIG. 5, the controller may operate in conjunction with the eye tracking sensors 140 to selectively drive only one of the plurality of image-providing devices, based on information received from the eye tracking sensors 140. The controller may measure a fixation depth of a user, based on an interpupillary distance and a binocular vergence angle obtained from the eye tracking sensors 140 and may drive only an image-providing device that provides an image closest to the fixation depth, among the plurality of image-providing devices. For example, the controller may drive only the image-providing device 112 without driving the image-providing device 111 since the closest image to the fixation depth in FIG. 5 corresponds to the virtual image 112-2 provided by the image-providing device 112.

The controller may convert a fixation depth and a virtual image depth into dioptric values and may determine a specific image-providing device to be selectively driven, by using the dioptric values. For example, the controller may convert a fixation depth and a virtual image depth into dioptric values and may selectively drive one of the plurality of image-providing devices such that a difference between the dioptric value corresponding to the fixation depth and the dioptric value corresponding to the virtual image depth is within the depth of field of the user's eyes (e.g., 0.3 diopters (D)). Alternatively, when there is no image-providing device satisfying the above condition, the controller may selectively drive one of the plurality of image-providing devices such that the difference between the dioptric value corresponding to the fixation depth and the dioptric value corresponding to the virtual image depth is within a visual fatigue reduction range of the user (e.g., 0.5 D). In another case, when there is no image-providing device satisfying the above two conditions, the controller may select and drive one image-providing device that minimizes the difference between the dioptric value corresponding to the fixation depth and the dioptric value corresponding to the virtual image depth.

FIG. 6 illustrates an example that the controller processes images to allow an augmented reality image to be viewed at a specific depth. In this case, the multi-focal augmented reality devices described with reference to FIGS. 1 to 4 may not include the eye tracking sensors 140. The controller may allow an image output through the augmented reality image synthesis device 120 to be viewed at a predetermined specific depth, by processing images provided from the plurality of image-providing devices 111 and 112 by using a depth-fused 3D method for adjusting luminance ratios of the images provided from the plurality of image-providing devices 111 and 112 or a compressive light field display method for representing rays of light constituting the images as the sum or product of pixels located at the specific depth. That is, as illustrated in FIG. 6, the virtual images 111-2 and 112-2 provided by the image-providing devices may be processed to locate a virtual image at any point between the depths of the virtual images 111-2 and 112-2.

Here, the depth-fused 3D method may be used to adjust luminance ratios of images located on the same visual axis in image planes located at different depths, thereby making an image appear to be located at any point between the two depths. The compressive light field display method may represent a ray of light passing through a space as the sum or product of pixels located in depth image planes at different depths. Since light radiating from an actual 3D image and passing through a space is simulated as a bundle of light rays, each light ray may be mathematically represented as a vector product, and a bundle of light rays may be represented as a light-ray projection matrix having multiple light-ray vectors. In the present disclosure, an additive compressive light field method may be applied, and a bundle of light rays may be represented as the product of a light-ray projection matrix and a pixel vector matrix, as in Equation 3 below.

[Equation 3]

$$\begin{bmatrix} L(g, h_1) \\ g_1 \\ \vdots \\ g_m \\ \vdots \\ L(g, h_m) \\ g_1 \\ \vdots \\ g_m \end{bmatrix} = \begin{bmatrix} L(g_1, h_1) \\ [\delta_1, \delta_1] \ (Ix \ Row \ No.) \\ \vdots \\ L(g_m, h_m) \\ [\delta_1, \delta_m] \end{bmatrix} \begin{bmatrix} I_1(x) \\ g_1 \\ \vdots \\ g_m \\ \vdots \\ I_2(x) \\ h_1 \\ \vdots \\ h_m \end{bmatrix},$$

where $L(g, h_1)$ is a vector representing a ray of light, $\delta_i$ is a projection vector in which an $i^{th}$ component has a value of 1 and the remaining components have a value of 0, and $I(x)$ is a pixel vector.

As described above, according to the present disclosure, the controller may selectively drive the image-providing devices, or may perform image processing, to minimize a difference between a user's fixation point and a depth at which a virtual image is provided or to match the fixation point and the depth of the virtual image, thereby minimizing visual fatigue caused by defocusing.

While the multi-focal augmented reality devices according to embodiments of the present disclosure have been described, it is to be understood that the present disclosure is not limited to the disclosed embodiments, but, on the contrary, is intended to cover various modifications and equivalent arrangements included within the spirit and scope of the appended claims.

What is claimed is:

1. A multi-focal augmented reality device comprising:
    a multi-focal display configured to provide a plurality of images output from a plurality of image-providing devices and located at different depths; and
    an augmented reality image synthesis device configured to synthesize the plurality of images provided by the multi-focal display and an external image;
    wherein the augmented reality image synthesis device comprises a beam splitter and a concave mirror that are configured to synthesize the images provided by the multi-focal display and the external image, and
    wherein the beam splitter is disposed to reflect an image provided by the multi-focal display and then reflected by the concave mirror after passing through the beam splitter and to pass the external image.

2. The multi-focal augmented reality device of claim 1, wherein the plurality of image-providing devices are disposed at different distances from a lens disposed between the multi-focal display and the augmented reality image synthesis device to provide the plurality of images located at the different depths.

3. The multi-focal augmented reality device of claim 1, wherein the beam splitter is configured to match travelling directions of the plurality of images by passing some of the plurality of images and reflecting other images, such that the plurality of images provided from the plurality of image-providing devices are viewed at a same position by a user.

4. The multi-focal augmented reality device of claim 3, wherein a number of beam splitters is one less than a number of image-providing devices.

5. The multi-focal augmented reality device of claim 1, wherein an image synthesized through the beam splitter is provided in a stereoscopic 3D manner.

6. The multi-focal augmented reality device of claim 1, further comprising:
    a controller configured to process the images provided by the plurality of image-providing devices, such that an image output through the augmented reality image synthesis device is viewed at a predetermined specific depth.

7. The multi-focal augmented reality device of claim 6, wherein the controller applies a depth-fused 3D method for adjusting luminance ratios of the images provided by the plurality of image-providing devices or a compressive light field display method for representing rays of light constituting the images as a sum or product of pixels located at the specific depth.

8. The multi-focal augmented reality device of claim 1, further comprising:
    an eye tracking sensor configured to track eyes of a user that views an image output from the augmented reality image synthesis device; and
    a controller configured to operate in conjunction with the eye tracking sensor to selectively drive only some of the plurality of image-providing devices, based on information received from the eye tracking sensor.

9. The multi-focal augmented reality device of claim 8, wherein the controller measures a fixation depth of the user, based on an interpupillary distance and a binocular vergence angle obtained from the eye tracking sensor, and drives only an image-providing device that provides an image closest to the fixation depth, among the plurality of image-providing devices.

10. The multi-focal augmented reality device of claim 1, wherein the plurality of image-providing devices correspond to an organic light emitting diode (OLED), a liquid crystal display (LCD), a liquid crystal on silicon (LCoS), a digital micro-mirror device (DMD), or a micro-electro-mechanical system (MEMS) scanning mirror.

* * * * *